(12) United States Patent
Wanami et al.

(10) Patent No.: US 7,406,875 B2
(45) Date of Patent: Aug. 5, 2008

(54) PRESSURE SENSOR FOR A VEHICLE

(75) Inventors: Shingo Wanami, Kariya (JP); Kazushige Suematsu, Toyota (JP); Toshihito Nonaka, Chiryu (JP); Minoru Fujioka, Anjo (JP); Taiki Katsu, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/519,190

(22) Filed: Sep. 11, 2006

(65) Prior Publication Data

US 2007/0068276 A1   Mar. 29, 2007

(30) Foreign Application Priority Data

Sep. 13, 2005   (JP) ............................. 2005-265370

(51) Int. Cl.
*G01L 7/08* (2006.01)
(52) U.S. Cl. .......................................... 73/715; 73/700
(58) Field of Classification Search ........... 73/700–756; 361/283.1–283.4
See application file for complete search history.

(56) References Cited

U.S. PATENT DOCUMENTS

| | | | | |
|---|---|---|---|---|
| 6,059,483 A | * | 5/2000 | Owens et al. | 403/267 |
| 6,155,119 A | * | 12/2000 | Normann et al. | 73/756 |
| 6,365,424 B1 | | 4/2002 | Bauer et al. | |
| 6,647,793 B2 | | 11/2003 | Dirmeyer et al. | |
| 6,854,918 B2 | | 2/2005 | Ueno et al. | |

FOREIGN PATENT DOCUMENTS

| | | |
|---|---|---|
| DE | 103 33 964 | 2/2005 |
| JP | 02-236132 | 9/1990 |
| JP | 02-249740 | 10/1990 |
| JP | 06-273248 | 9/1994 |

OTHER PUBLICATIONS

Office action dated Feb. 29, 2008 in German application No. 10 2006 042 680.0 with English translation thereof.

* cited by examiner

*Primary Examiner*—Andre J. Allen
*Assistant Examiner*—Jermaine Jenkins
(74) *Attorney, Agent, or Firm*—Harness, Dickey & Pierce, PLC

(57) ABSTRACT

A pressure sensor is provided with a housing which has an opening portion for communicating an interior of the housing with an exterior, and a pressure detecting unit which has a detection surface for detecting a pressure applied thereto through the opening and is arranged in the housing. One of a perimeter of the detection surface and that of the opening portion has a protrusion portion which protrudes toward other of the perimeters. The other of the perimeters has a groove, into which a tip of the protrusion portion is inserted. A seal member is arranged between the groove and the protrusion portion, to seal therebetween and buffer stress caused by relative displacement between the housing and the pressure detecting unit.

14 Claims, 3 Drawing Sheets

PRESSURE SENSOR FOR A VEHICLE

CROSS REFERENCE TO RELATED APPLICATION

This application is based on a Japanese Patent Application No. 2005-265370 filed on Sep. 13, 2005, the disclosure of which is incorporated herein by reference.

FIELD OF THE INVENTION

The present invention relates to a pressure sensor.

BACKGROUND OF THE INVENTION

Generally, a vehicle is provided with a passenger protecting system for protecting passengers in a collision of the vehicle. The passenger protecting system has, for example, an airbag device for deploying an airbag to protect the head portion or the like of the passenger, and/or a pre-tensioner device for taking up a slack of a seat belt of the vehicle.

The airbag device and the pre-tensioner device are controlled by a control unit such as an ECU. The ECU performs a determination of a vehicle collision based on signals from sensors mounted to the vehicle, and actuates the airbag device and the pre-tensioner device when the vehicle collision is determined.

It is desirable for the passenger protecting system to protect the passenger not only from a vehicle collision in the vehicle traveling direction (i.e., vehicle front-rear direction), but also from a side collision of the vehicle which causes a vehicle-width-direction impact on the vehicle. For example, as disclosed in JP-2-249740A, the airbag device for protecting the passenger from the side collision of the vehicle is provided with a side airbag, which can be deployed according to detection signals of a pressure sensor. The pressure sensor detects the variation of an inner pressure of the vehicle door.

As shown in FIG. 4, a pressure sensor 1 for detecting the side collision has a substantially hollow case 2 and a circuit assembly 3 which is fixedly housed in the case 2. The case 2 is provided with an air passage 22 for communicating the interior of the case 2 with the exterior. The pressure sensor 1 which is required to have a high watertightness performance is provided with a rubber packing 7 between the case 2 and a sensing unit 31 (for detecting pressure) of the circuit assembly 3. Thus, water is restricted from intruding upon the case 2 except the surface of the sensing unit 31, by the rubber packing 7 arranged between the circuit assembly 3 and the case 2. Therefore, a malfunction due to a wetting of a circuit board 30 is restricted.

However, because the pressure sensor 1 is provided with the rubber packing 7 for sealing, it is necessary for the circuit board 30, the pressure detecting unit 31 and the housing 2 of the pressure sensor 1 to be provided with high dimension accuracy. Therefore, the manufacture cost is increased.

Moreover, the pressure sensor 1 is constructed in such a manner that the case 2 and the pressure detecting unit 31 mounted to the circuit board 30 press against the rubber packing 7. That is, the stress pressing the rubber packing 7 is transferred to a coupling part between the circuit board 30 and the pressure detecting unit 31. Therefore, it is difficult to maintain the reliability of the sensing unit 31, the electrical connection portion and the circuit elements of the pressure sensor 1.

Furthermore, in order to improve the watertightness performance and restrict the malfunction due to stress concentration, the pressure sensor 1 is provided with a potting member 8 which is constructed by an injection of a potting material to support the circuit assembly 3 and the circuit board 30. Thus, the manufacture cost is further increased.

SUMMARY OF THE INVENTION

In view of the above-described disadvantages, it is an object of the present invention to provide a pressure sensor having a low cost and a high reliability.

According to the present invention, the pressure sensor has a housing which has an opening portion for communicating an interior of the housing with an exterior thereof, a pressure detecting unit which has a detection surface for detecting a pressure and is arranged in the housing, and a seal member. One of a perimeter of the detection surface of the pressure detecting unit and that of the opening portion of the housing has a protrusion portion which protrudes toward other of the perimeters. The other of the perimeters has a groove, into which a tip of the protrusion portion is inserted. The seal member is arranged between the groove and the protrusion portion to seal therebetween.

Thus, the part between the housing and the pressure detecting unit can be sealed via the arrangement of the groove, the protrusion portion and the seal member. Therefore, foreign matter such as water can be restricted from entering the housing through the opening portion of the housing, thus reducing a malfunction.

Preferably, the seal member is made of a buffer material to buffer stress caused by a relative displacement between the housing and the pressure detecting unit.

Therefore, the stress concentration at the pressure detecting unit can be restricted even when the relative displacement occurs between the housing and the pressure detecting unit. In this case, the seal member can be constructed of a soft material, for example. Thus, the positioning-accuracy requirement between the pressure detecting unit and the housing can be loosened.

Accordingly, the pressure sensor can be provided with an improved reliability and a restricted cost.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

Preferred Embodiment

Figure 1A:
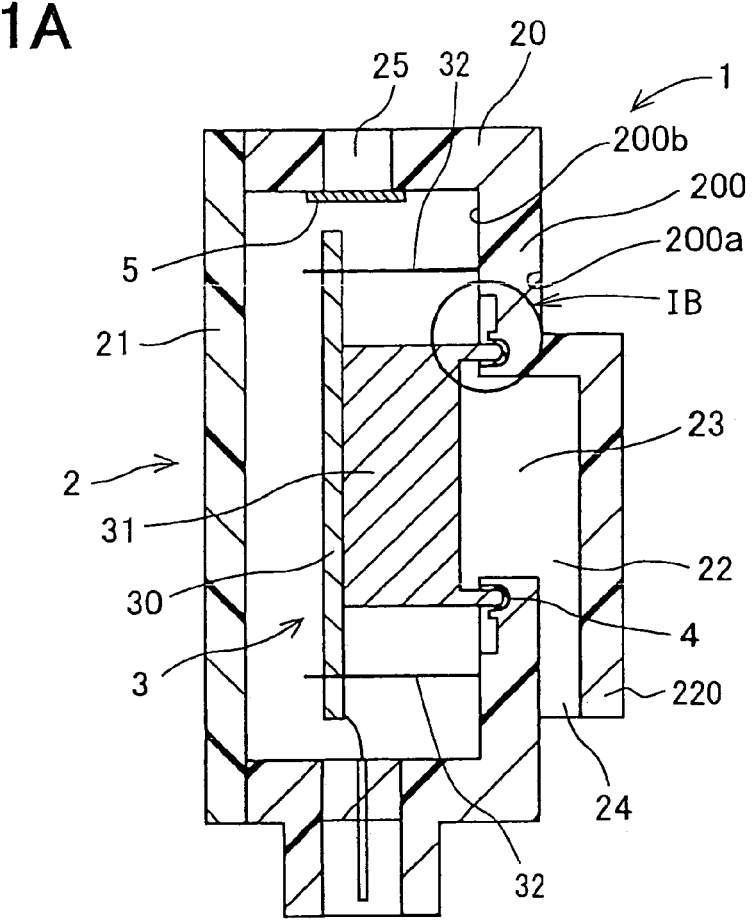
FIG. 1A is a schematic sectional view showing a construction of a pressure sensor according to a preferred embodiment of the present invention.

A pressure sensor 1 according to a preferred embodiment of the present invention will be described with reference to FIGS. 1A-2B. As shown in FIG. 1A, the pressure sensor 1 is provided with a housing 2, a circuit assembly 3, a seal member 4 and a filter 5.

The housing 2 is made of a resin or the like and accommodates therein the circuit assembly 3. The housing 2 includes a housing body 20 having a substantial sink shape, and a cover member 21 for covering an opening portion of the housing body 20. The pressure senor 1 can be mounted to, for example, a vehicle in such a manner that a bottom portion 200 (which is opposite to the opening portion) of the substantially sink-shaped housing body 20 extends in a substantially vertical direction.

The housing body 20 has an air passage 22, through which the interior and the exterior of the housing 2 are communicated with each other. The air passage 22 has a substantial pipe shape. The air passage 22 can be defined by an outer surface 200a of the bottom portion 200 and a passage wall portion 220, which protrudes outward from the bottom portion 200 and extends toward a substantially vertically lower side. That is, the air passage 22 extends toward the substantially vertically lower side along the outer surface 200a of the bottom portion 200.

In this case, the passage wall portion 220 extends downward to partially overlap upon (i.e., extends over) the outer surface 200a with the air passage 22 arranged therebetween.

One end of the air passage 22 has an opening portion 23 which is formed at the bottom portion 200 of the housing body 20. Other end of the air passage 22 has an opening portion 24 defined by the outer surface 200a and a tip of the part of the passage wall portion 220 which overlaps upon the outer surface 200a. The part of the passage wall portion 220 which overlaps upon the outer surface 200a of the bottom portion 200 is provided with such a length (in extension direction) that the opening portion 23 of the one end of the air passage 22 cannot be visually viewed from the opening portion 24 of the other end thereof.

The cross section of the air passage 22 can remain substantially invariant. The inner diameter of the air passage 22 is set so that the air passage 22 can provide an air communication between the interior and the exterior of the housing 2.

The circuit assembly 3 has a circuit board 30 and a pressure detecting unit 31, which is mounted to the circuit board 30 to detect a pressure. The circuit board 30 is provided with a calculation unit (not shown) for calculating the pressure according to detecting signals from the pressure detecting unit 31, and an interface (not shown) for sending pressure signals to the exterior, and the like.

In this embodiment, the sort of the circuit assembly 3 is not limited, on condition that the circuit assembly 3 can detect the pressure. For example, the circuit assembly 3 can be a diaphragm typed pressure senor.

The circuit assembly 3 is fixedly mounted to the housing body 20 through a connection member 32, in such a manner that a detection surface of the pressure detecting unit 31 faces the opening portion 23 and is arranged at a small distance from the bottom portion 200 of the housing body 20. For example, the two ends of the connection member 32 can be respectively fixed to the circuit board 30 and the housing body 20. The detection surface of the pressure detecting unit 31 detects the pressure (of the exterior) which is applied to the detection surface through the opening portion 23.

Figure 1B:
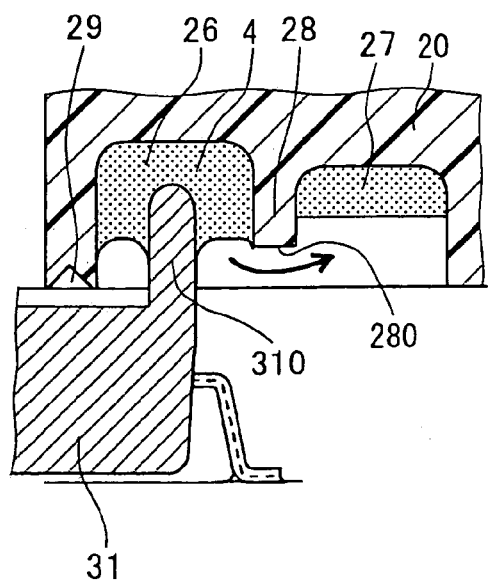
FIG. 1B is an enlarged sectional view showing a part IB in FIG. 1A.

As shown in FIG. 1B, the pressure detecting unit 31 is provided with a protrusion portion 310. The protrusion portion 310 is positioned at the perimeter (i.e., outside edge) of the detection surface of the pressure detecting unit 31, and protrudes toward the side of an inner surface 200b (which is at opposite side of bottom portion 200 to outer surface 200a) of the bottom portion 200. The protrusion portion 310 is arranged at the whole circumference of the detection surface of the pressure detecting unit 31 which faces the opening portion 23, to improve the sealing performance.

The bottom portion 200 of the housing body 20 is provided with a groove 26, a first reservoir 27, and a second reservoir 29, which are formed at the side of the inner surface 200b of the bottom portion 200 as concave portions from the inner surface 200b. That is, each of the groove 26, the first reservoir 27 and the second reservoir 29 has an opening at the side of the inner surface 200b.

The groove 26 faces the protrusion portion 310 of the pressure detecting unit 31. The tip of the protrusion portion 310 has a smoothly-shaped cross section (e.g., substantially U-shaped cross section), and is inserted into the groove 26.

The first reservoir 27 can have a substantially U-shaped cross section, and is positioned adjacently to the groove 26. The first reservoir 27 is formed at the bottom portion 200 at the outer side (i.e., radius-direction outer side of opening portion 23) of the groove 26 with respect to the opening portion 23.

The groove 26 is separated from the first reservoir 27 by an isolation wall 28 (i.e., draining portion). The opposite surfaces of the isolation wall 28 respectively define a part of the groove 26 and a part of the first reservoir 27. That is, the isolation wall 28 interfaces (joins) the groove 26 with the first reservoir 27.

The isolation wall 28 which is arranged between the first reservoir 27 and the groove 26 has an end surface 280 (draining surface) at the side of the inner surface 200b of the bottom portion 200. A distance (being dimension in thickness direction of bottom portion 200) between the end surface 280 and the outer surface 200a of the bottom portion 200 is smaller than that between the inner surface 200b and the outer surface 200a. That is, the inner surface 200b of the bottom portion 200 is notched to construct the isolation wall 28, so that the isolation wall 28 can be provided with a predetermined height which is a dimension in the thickness direction of the bottom portion 200.

The second reservoir 29 can have a substantially V-shaped cross section, and adjoin the groove 26. The second reservoir 29 is formed at the bottom portion 200 at the inner side (i.e., radius-direction inner side of opening portion 23) of the groove 26 with respect to the opening portion 23.

In this embodiment, the second reservoir 29 is contiguous with the groove 26. That is, the opening of the second reservoir 29 is substantially continuous with that of the groove 26 in the extension direction of the inner surface 200b of the bottom portion 200. Alternatively, the second reservoir 29 can be also spaced from the groove 26 in the extension direction of the inner surface 200b.

In this case, the seal member 4 is arranged in the groove 26 and positioned between the groove 26 and the protrusion portion 310. Thus, the pressure loss due to the size of the capacity of the housing 2 can be restricted, so that the pressure of the exterior of the housing 2 can be substantially detected by the pressure detecting unit 31 via the air passage 22.

The seal member 4 is made of a material which can buffer (absorb) the stress occurring due to a relative displacement between the housing body 20 and the pressure detecting unit 31. Thus, when the relative displacement occurs between the housing body 20 and the pressure detecting unit 31, the stress at a coupling part between the pressure detecting unit 31 and the circuit board 30 can be reduced via the seal member 4. For example, the seal member 4 can be made of a Si-base adhesive, a Si-base gel, a F-base gel or the like.

The housing body 20 is further provided with a communication aperture 25 which is a through hole for communicating the interior of the housing 2 with the exterior. The position of the communication aperture 25 is not limited, on condition that the communication aperture 25 is arranged at the housing body 20 at the outer side (i.e., outer side of radius-direction of opening portion 23) of the groove 26 and the first reservoir 27 with respect to the opening portion 23. For example, the communication aperture 25 can be formed at a flank portion (defined with respect to bottom portion 200) of the substantially sink-shaped housing body 20.

The filter 5 is breathable (i.e., admitting of air flowing therethrough), and is fixedly mounted to the housing body 20 to cover the communication aperture 25. That is, there exists the air communication between the interior and the exterior of the housing 2 via the communication aperture 25 having covered by the filter 5. Thus, the pressure difference between the interior and the exterior of the housing 2 can be restricted.

The mounting method of the filter 5 to the housing body 20 is not limited. For example, the filter 5 can be fixed to the housing body 20 by welding, or by engaging through an engagement nail arranged at the housing body 20, or by bonding through an adhesive tape or an adhesive.

The filter 5 can restrict foreign matter such as water from entering the circuit assembly 3 through the communication aperture 25. In this case, the communication aperture 25 can provide an air-communication between the interior of the housing 2 and the exterior, so that the pressure at the interior and the exterior of the housing 2 is substantially same.

Next, a manufacture method of the pressure sensor 1 will be described.

At first, a raw material solution (which is liquid to be hardened to construct seal member 4) of the seal member 4 is provided in the groove 26 of the housing body 20 of the housing 2. Then, the circuit assembly 3 is fixedly mounted to the housing body 20 through the connection member 32.

In this case, the tip of the protrusion portion 310 of the pressure detecting unit 31 is plunged in the raw material solution accommodated in the groove 26. Therefore, the fluid level of the raw material solution in the groove 26 becomes high. When the fluid level of the raw material solution exceeds the end surface 280 of the isolation wall 28 (i.e., draining portion), the raw material solution will spill from the groove 26 to the first reservoir 27 along the end surface 280 of the isolation wall 28.

That is, the excess part of the raw material solution can be introduced by the isolation wall 28 having the predetermined height, to flow into the first reservoir 27. Moreover, the excess part of the raw material solution can be also stored in the second reservoir 29, so that the overflow toward the opening portion 23 can be restricted. Thus, the overflow of the raw material solution toward the side of the opening portion 23 can be reduced. Furthermore, the overflow from the groove 26 can be controlled, by changing the height of the isolation wall 28. Therefore, the size of the seal member 4 can be adjusted.

After the circuit assembly 3 is arranged in the housing body 20, the raw material solution of the seal member 4 is hardened and the cover member 21 is fixed to the housing body 20 by welding or the like to cover the opening portion (being opposite to bottom portion 200) of the housing body 20.

Thus, the circuit assembly 3 and the like can be mounted in the housing body 2 from the opening side (where cover member 21 will be attached) of the housing body 20. Therefore, the pressure sensor 1 according to this embodiment can be readily manufactured. Moreover, because the circuit assembly 3 is fixed to the housing body 20 through the connection member 32, a fixing accuracy requirement can be loosened. Accordingly, the manufacture cost of the pressure sensor 1 can be reduced.

Next, the effect of the pressure sensor 1 will be described.

In this case, the pressure sensor 1 is suitably used in a collision detecting system which can be provided for a passenger protecting device in a vehicle. The passenger protecting device has a side airbag or the like to protect a passenger from a side collision of the vehicle. The side airbag or the like can be actuated when the collision detecting system has detected the side collision of the vehicle.

Figure 2A:
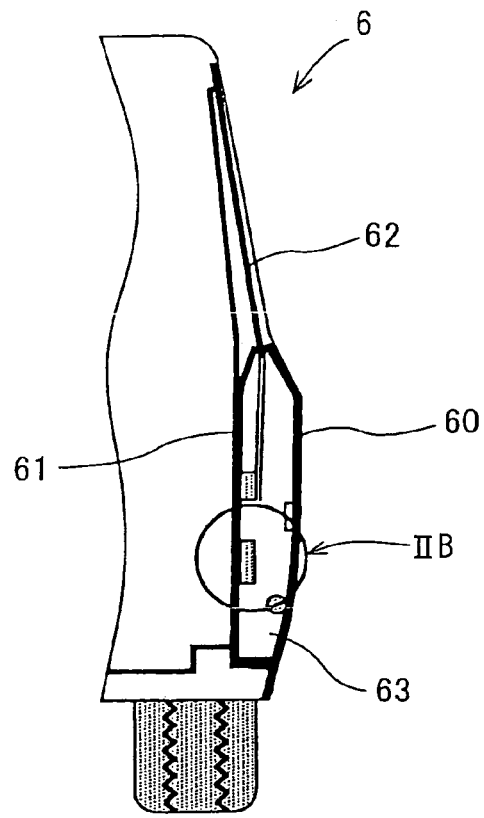
FIG. 2A is a schematic view showing a collision detecting system having the pressure sensor according to the preferred embodiment.
Figure 2B:
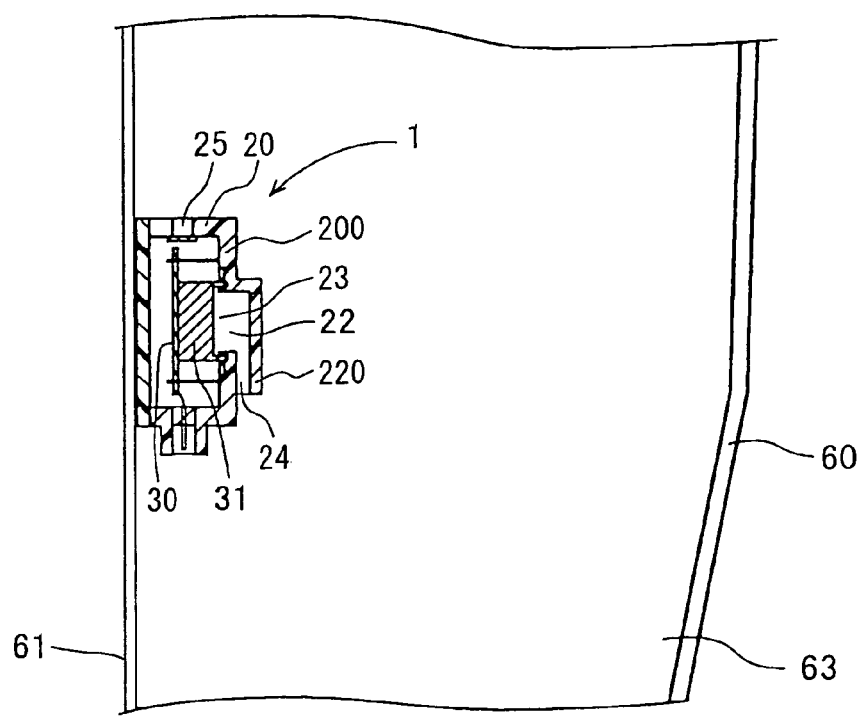
FIG. 2B is an enlarged partially-sectional view showing a part IIB in FIG. 2A.

As shown in FIGS. 2A and 2B, the collision detecting system is provided with the pressure sensor 1, which is mounted in a space 63 formed in a door 6 of the vehicle to detect a pressure variation (due to deformation of door 6 caused by side collision or the like) of the interior of the door 6. In this case, the pressure sensor 1 is attached to the door 6 in such a manner that the air passage 22 extends in the substantially vertical direction, for example.

The door 6 has an outer panel 60, an inner panel 61 and a window glass 62. The outer panel 60 constructs a part of an exterior member of the vehicle. The inner panel 61 constructs a part of an interior member of the vehicle. That is, the inner panel 61 is positioned at the side of a passenger compartment of the vehicle.

The door 6 has therein the substantially closed space 63 between the outer panel 60 and the inner panel 61. The space 63 is provided with a small communication (fluid communication) with the exterior of the door 6. When the pressure (air pressure) of the exterior of the door 6 varies, the pressure (air pressure) in the space 63 of the interior of the door 6 also varies. The space 63 is formed in such a manner that the pressure in the space 63 (i.e., inner pressure of door 6) will increase when the capacity (i.e., volume) of the space 63 sharply varies.

For example, when there occurs a collision between an obstacle and the door 6 of the vehicle, the obstacle contacts the outer panel 60 of the door 6 and presses the outer panel 60 toward the inner side (side of passenger compartment) of the vehicle. Thus, the outer panel 60 is deformed to protrude toward the side of the inner panel 61. Because the impact due to the collision is not directly applied to the inner panel 61, the shape of the inner panel 61 can be temporally maintained.

Therefore, in the case where the outer panel 60 is deformed due to the collision, the capacity of the space 63 of the interior of the door 6 will be sharply reduced. The amount of the fluid communication between the space 63 and the exterior of the door 6 is relatively small, and as such, the pressure in the space 63 increases significantly. The pressure in the space 63 is detected by the pressure sensor 1.

When the pressure in the space 63 of the door 6 increases, the pressure around the pressure sensor 1 will also increase. The space 63 is communicated with the interior of the housing 2 through the air passage 22 having the opening portion 24 and the opening portion 23, which faces the detection surface of the pressure detecting unit 31. That is, the pressure is applied to the pressure detecting unit 31 of the circuit assembly 3 which is arranged in the housing 2, to be detected.

The pressure signals detected by the circuit assembly 3 can be sent to an airbag ECU which performs a determination of the collision based on the pressure signals. The side airbag or the like will be deployed when the collision has been determined.

In the collision detecting system, the pressure sensor 1 can be mounted to the door 6 in such a manner that the air passage 22 extends in the substantially vertical direction. Thus, it is difficult for foreign matter such as water and dust which entered the space 63 of the door 6 to intrude upon the air passage 22. In this case, even when the foreign matter entered the air passage 22 from the opening portion 24, the foreign matter hardly passes the air passage 22 due to the gravitation thereof.

Furthermore, even when the foreign matter passed the air passage 22, the foreign matter hardly enters the housing 2 because of the sealing between the housing body 20 and the pressure detecting unit 31 via the groove 26, the protrusion portion 310 and the seal member 4. Therefore, a malfunction or the like due to a wetting of the circuit board 30 can be restricted.

According to this embodiment, the pressure sensor 1 has an improved reliability and a restricted cost. Thus, the collision detecting system having a low cost and an enhanced reliability can be provided.

Other Embodiments

Although the present invention has been fully described in connection with the preferred embodiments thereof with reference to the accompanying drawings, it is to be noted that various changes and modifications will become apparent to those skilled in the art.

Figure 3:
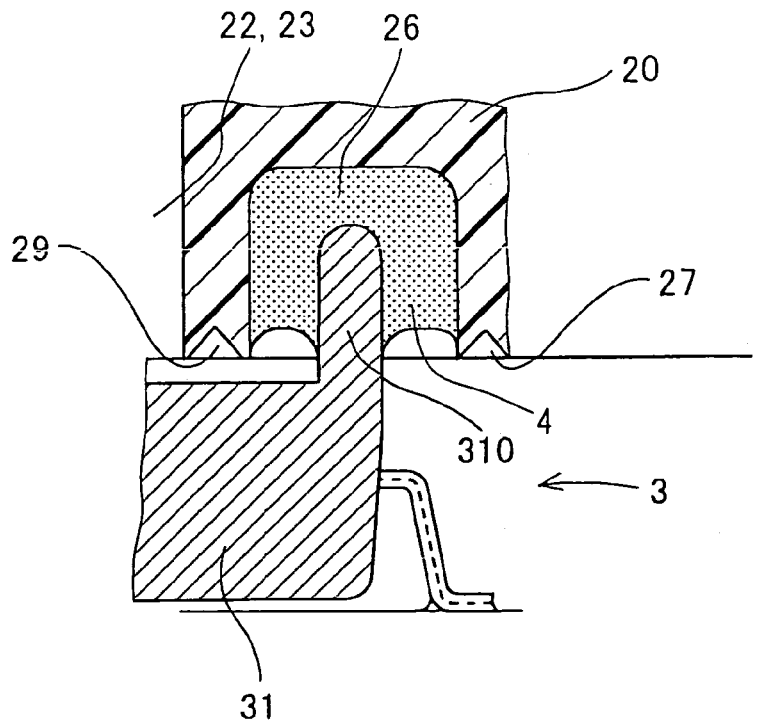
FIG. 3 is a schematic sectional view showing a construction of a pressure sensor according to other embodiment of the present invention.
Figure 4:
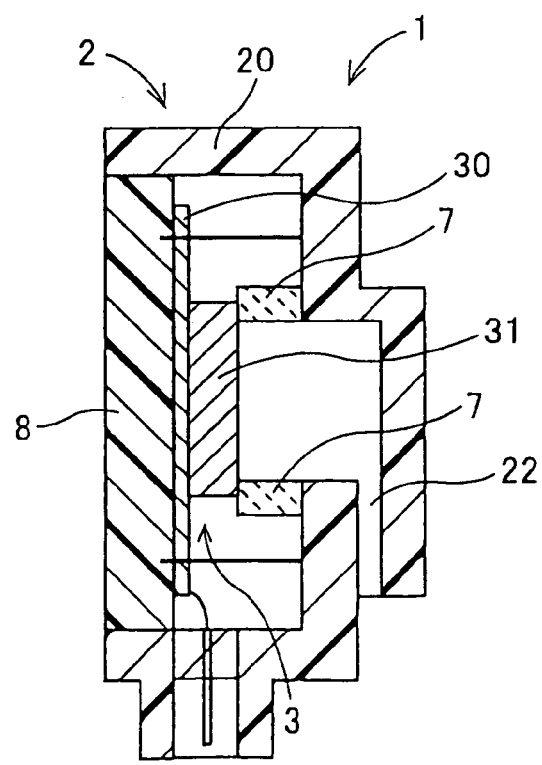
FIG. 4 is a schematic sectional view showing a construction of a pressure sensor according to a related art.

For example, the first reservoir 27 which is opened at the inner surface 200b of the bottom portion 200 can be also formed as shown in FIG. 3. In this case, the first reservoir 27 is contiguous with the groove 26, and arranged at the outer side of the groove 26 with respect to the opening portion 23. That is, the opening of the first reservoir 27 is substantially continuous with that of the groove 26 in the extension direction of the inner surface 200b of the bottom portion 200. For example, the first reservoir 27 can be provided with a substantially V-shaped cross section, similarly to the second reservoir 29.

Thus, when the seal member 4 is constructed by hardening the raw material solution thereof, the excess raw material solution can flow into the first reservoir 27 and the second reservoir 29. Therefore, the adhesion of the raw material solution of the seal member 4 to the unplanned part (e.g., circuit board 30) can be restricted.

Moreover, the protrusion portion 310 can be also arranged at the perimeter (i.e., outer edge) of the opening portion 23 of the housing 2. In this case, the groove 26, the first reservoir 27 and the second reservoir 29 can be arranged at the perimeter of the detection surface of the pressure detecting unit 31.

Such changes and modifications are to be understood as being in the scope of the present invention as defined by the appended claims.

What is claimed is:

1. A pressure sensor comprising:
    a housing which has an opening portion for communicating an interior of the housing with an exterior thereof;
    a pressure detecting unit which has a detection surface for detecting a pressure and is arranged in the housing; and
    a seal member, wherein
    a perimeter of the detection surface of the pressure detecting unit has a protrusion portion which protrudes toward a perimeter of the opening portion of the housing;
    the perimeter of the opening portion of the housing has a groove, into which a tip of the protrusion portion is inserted; and
    the seal member is arranged between the groove and the tip of the protrusion portion to seal therebetween.

2. The pressure sensor according to claim 1, wherein the seal member is made of a buffer material to buffer stress caused by a relative displacement between the housing and the pressure detecting unit.

3. The pressure sensor according to claim 2, wherein
    the seal member is constructed by a hardening of a raw material solution in such a manner that the tip of the protrusion portion is plunged in the raw material solution, which is reserved in the groove.

4. The pressure sensor according to claim 3, wherein:
    one of the pressure detecting unit and the housing where the groove is arranged has a reservoir for accommodating the raw material solution of the seal member; and
    when a liquid level of the raw material solution in the groove is beyond a predetermined position, the raw material solution overflows from the groove into the reservoir.

5. The pressure sensor according to claim 4, wherein:
    the one of the pressure detecting unit and the housing has a draining portion, through which the groove and the reservoir connect; and
    the draining portion has a draining surface positioned in correspondence with the predetermined position, so that the raw material solution in the groove beyond the draining surface overflows from the groove into the reservoir along the draining surface.

6. The pressure sensor according to claim 2, wherein each of the groove and the protrusion portion is arranged at a whole circumference of the perimeter.

7. The pressure sensor according to claim 2, further comprising
    a filter, wherein:
    the housing has a communication aperture; and
    the communication aperture is covered by the filter, through which the interior of the housing is in air communication with the exterior.

8. The pressure sensor according to claim 2, wherein the protrusion portion is arranged at the pressure detecting unit and the groove is arranged at the housing.

9. The pressure sensor according to claim 2, wherein the detection surface of the pressure detecting unit faces the opening portion.

10. The pressure sensor according to claim 1, wherein the pressure detecting unit measures an inner pressure of a door of a vehicle for a detection of a side collision of the vehicle.

11. The pressure sensor according to claim 10, wherein:
    the housing includes an air passage for communicating the interior of the housing with the exterior, the opening portion being arranged at one end of the air passage, and
    the housing is mounted to the vehicle in such a manner that an opening portion of other end of the air passage is portioned at a lower side of the opening portion of the one end.

12. A pressure sensor comprising:
    a housing which has an opening portion for communication an interior of the housing with an exterior thereof;
    a pressure detecting unit which has a detection surface for detecting a pressure and is arranged in the housing; and
    a seal member made of a buffer material to buffer stress caused by a relative displacement between the housing and the pressure detecting unit, wherein
    one of a perimeter of the detection surface of the pressure detecting unit and that of the opening portion of the housing has a protrusion portion which protrudes toward other of the perimeters;
    the other of the perimeters has a groove, into which a tip of the protrusion portion is inserted; and the seal member is arranged between the groove and the tip of the protrusion portion to seal therebetween and is constructed by a hardening of a raw material solution in such a manner that the tip of the protrusion portion is plunged in the raw material solution, which is reserved in the groove, wherein one of the pressure detecting unit and the housing where the groove is arranged has a reservoir for accommodating the raw material solution of the seal member; and when a liquid level of the raw material solution in the groove is beyond a predetermined position, the raw material solution overflows from the groove into the reservoir.

13. The pressure sensor according to claim 12, wherein:

the one of the pressure detecting unit and the housing has a draining portion, through which the groove and the reservoir connect; and the draining portion has a draining surface positioned in correspondence with the predetermined position, so that the raw material solution in the groove beyond the draining surface overflows from the groove into the reservoir along the draining surface.

14. A pressure sensor comprising:

a housing which has an opening portion for communicating an interior of the housing with an exterior thereof;

a pressure detecting unit which has a detection surface for detecting a pressure and is arranged in the housing; and a seal member, wherein one of a perimeter of the detection surface of the pressure detecting unit and that of the opening portion of the housing has a protrusion portion which protrudes toward other of the perimeters;

the other of the perimeters has a groove, into which a tip of the protrusion portion is inserted, wherein the tip of the protrusion portion and a lower portion of the groove define a passageway; and the seal member is arranged between the groove and the tip of the protrusion portion to seal therebetween.

* * * * *